(12) United States Patent
Straub

(10) Patent No.: US 11,714,625 B2
(45) Date of Patent: *Aug. 1, 2023

(54) GENERATING APPLICATIONS FOR VERSATILE PLATFORM DEPLOYMENT

(71) Applicant: Oracle International Corporation, Redwood Shores, CA (US)

(72) Inventor: Christian Straub, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,221

(22) Filed: Jul. 13, 2022

(65) Prior Publication Data

US 2022/0350581 A1    Nov. 3, 2022

Related U.S. Application Data

(63) Continuation of application No. 16/368,682, filed on Mar. 28, 2019, now Pat. No. 11,422,783.

(60) Provisional application No. 62/743,420, filed on Oct. 9, 2018.

(51) Int. Cl.
*G06F 8/60* (2018.01)
*G06F 8/61* (2018.01)

(52) U.S. Cl.
CPC .................. *G06F 8/60* (2013.01); *G06F 8/61* (2013.01); *G06F 8/64* (2013.01)

(58) Field of Classification Search
CPC ..... G06F 8/10; G06F 8/30; G06F 8/33; G06F 8/34; G06F 8/40; G06F 8/60; G06F 8/61; G06F 8/64; G06F 8/75; G06F 8/76–77
See application file for complete search history.

(56) References Cited

U.S. PATENT DOCUMENTS

| | | |
|---|---|---|
| 5,699,507 A | 12/1997 | Goodnow |
| 8,316,349 B2 | 11/2012 | Morozov |
| 8,719,776 B2 | 5/2014 | Eteminan |
| 8,978,006 B2 | 3/2015 | Hirsch |
| 9,128,947 B2 | 9/2015 | Raina |
| 9,588,745 B1 | 3/2017 | Cismas |
| 9,645,916 B2 | 5/2017 | Wingfors |
| 10,140,119 B2 | 11/2018 | Hegarty |
| 10,776,178 B2 * | 9/2020 | Hargrove .............. G06F 40/186 |
| 11,422,783 B2 * | 8/2022 | Straub ...................... G06F 8/60 |

(Continued)

*Primary Examiner* — Todd Aguilera
(74) *Attorney, Agent, or Firm* — Trellis IP Law Group, PC

(57) ABSTRACT

Implementations generally relate to a method of automatically generating applications for multiple platforms based on one source of application code. Implementations include receiving a signal from a client device to initiate an application generation process, for example, through a graphical user interface (GUI). In an implementation, the application generation process analyzes the application code to differentiate between core application code, which is shared between many platforms, and device-specific code, and then separates the core application code from the device-specific code. The core application code may then be deployed for use in a plurality of applications such as a web application, progressive web application, or, as taken together with device-specific code, as a native mobile application. Applications may be deployed with features that are automatically determined based on their deployment method and the feature set of each platform.

20 Claims, 13 Drawing Sheets

(56) References Cited

U.S. PATENT DOCUMENTS

| | | |
|---|---|---|
| 2004/0059703 A1 | 3/2004 | Chappell |
| 2006/0277209 A1 | 12/2006 | Kral |
| 2011/0161912 A1 | 6/2011 | Eteminan |
| 2011/0296377 A1 | 12/2011 | Morozov |
| 2013/0247005 A1 | 9/2013 | Hirsch |
| 2014/0367461 A1 | 12/2014 | Raina |
| 2015/0347282 A1 | 12/2015 | Wingfors |
| 2017/0269929 A1 | 9/2017 | Hegarty |
| 2018/0373574 A1* | 12/2018 | Hargrove ................. G06F 8/60 |
| 2019/0065613 A1 | 2/2019 | Bilsten |
| 2019/0163453 A1 | 5/2019 | Seksenov |

* cited by examiner

New iOS Build Profile

Profile Name * — 602

Build Type — 604: Ad-hoc

Build ID * — 606: some.bundle.ios

Build Version Name * — 608: 1.0.0

Build Version * — 610: 1

Certificate * — 612: Drop file here or Click here to upload

Certificate Password — 614

Provisioning Profile * — 616: Drop file here or Click here to upload

Signing Identity * — 618: defaultsigning

☐ Default Profile for Stage/Publish — 620

Save

New Android Build Profile

Profile Name * — 602

Build Type — 604
Debug

Apple ID * — 702
default.android.appid

Version Name * — 704
1.0.0

Version Code * — 706
1

Keystore * — 708
Drop file here or Click here to upload

Keystore Password * — 710
●●●●●●

Key alias * — 712
default key alias

Key Password * — 714
●●●●●●

☐ Default Profile for Stage/Publish — 620

Save

GENERATING APPLICATIONS FOR VERSATILE PLATFORM DEPLOYMENT

CROSS REFERENCES TO RELATED APPLICATIONS

This application is a continuation of U.S. patent application Ser. No. 16/368,682, entitled AUTO-DEPLOYMENT OF APPLICATIONS, filed on Mar. 28, 2019 which claims the benefit of U.S. Provisional Patent Application Ser. No. 62/743,420, entitled AUTO-DEPLOYMENT BETWEEN NATIVE MOBILE DEVICE, PROGRESSIVE WEB APPLICATIONS, AND WEB APPLICATIONS, filed on Oct. 9, 2018, which are hereby incorporated by reference as if set forth in full in this application for all purposes.

SUMMARY

Due to the many software platforms (e.g. mobile, web) in use by consumers, companies typically develop applications, often separate applications, for each platform. For example, companies will often develop a web application, which may be viewed on a computer browser or a mobile phone browser, separate from a native mobile device application. Further, a native mobile device application, such as for an iOS platform, will often be developed separately than a native mobile device application for another application platform, such as an ANDROID platform. Developing and maintaining separate applications for each of these platforms can be costly and time-consuming.

Progressive web applications (PWA) are a new type of application that also are developed and maintained by many companies. PWAs are web applications that have some features of native mobile applications, like access to device permissions, push notifications, and a home screen icon.

Software frameworks like Cordova are available so that developers can write code once and build native ANDROID, native iOS, PWAs, and web applications from this code. Doing so cuts down on development time, as separate codebases need not be maintained for each platform. However, even with shared code, building and deploying the application for multiple platforms is still a manual, platform-specific process.

Embodiments described herein provide a method for automatically generating and deploying applications for different platforms (e.g. web, native iOS, native ANDROID, PWA) in response to an input signal, which may be a user-provided input or a signal generated from an automated pipeline.

Applications are deployed with features that are automatically determined based on their deployment method and the feature set of each platform. For example, if a web application can only get device location when the application is open and the native mobile application can get device location when the application is both open and in the background, the deployed application will take the platform and this corresponding feature set into account. When the developer requests location tracking as a feature for their application, the native mobile application will get location tracking when the app is active or in the background, and the web application will only get location tracking when the app is active, as per the capabilities of the platform. As in this example, the features are automatically determined based on the deployment method and the feature set of the platform, with no further programming needed.

A further understanding of the nature and the advantages of particular embodiments disclosed herein may be realized by reference of the remaining portions of the specification and the attached drawings.

BRIEF DESCRIPTION OF THE DRAWINGS

FIG. 6 illustrates an example user interface for configuring iOS specific build information.

FIG. 7 illustrates an example user interface for configuring ANDROID specific build information.

FIG. 8 illustrates an example user interface for configuring Progressive Web Application specific build information.

DETAILED DESCRIPTION

Implementations generally relate to a method of automatically generating applications for multiple platforms based on one source of application code. As described in more detail herein, one or more signals, for example from a client device, may be accepted to initiate an application generation process. During the application generation process, core application code, which may be shared between all or some platforms, may be determined then isolated from device-specific code, which may have been configured, for example, by a developer, designer, etc. The core application code may then be deployed as an application such as a web application, progressive web application, or, as taken together with device-specific code, as a native mobile application, etc. Applications may be deployed with features that are automatically determined based on factors such as their deployment method and the feature set of each platform.

Implementations described herein provide a Graphical User Interface (GUI) which enables developers to define common requirement for applications capable of being used in different platforms (e.g. web, native iOS, native ANDROID, PWA, and the like), and/or to define device specific requirements for applications to be deployed, and/or to test the applications automatically generated and deployed according to some implementations, in a convenient way.

Figure 1:
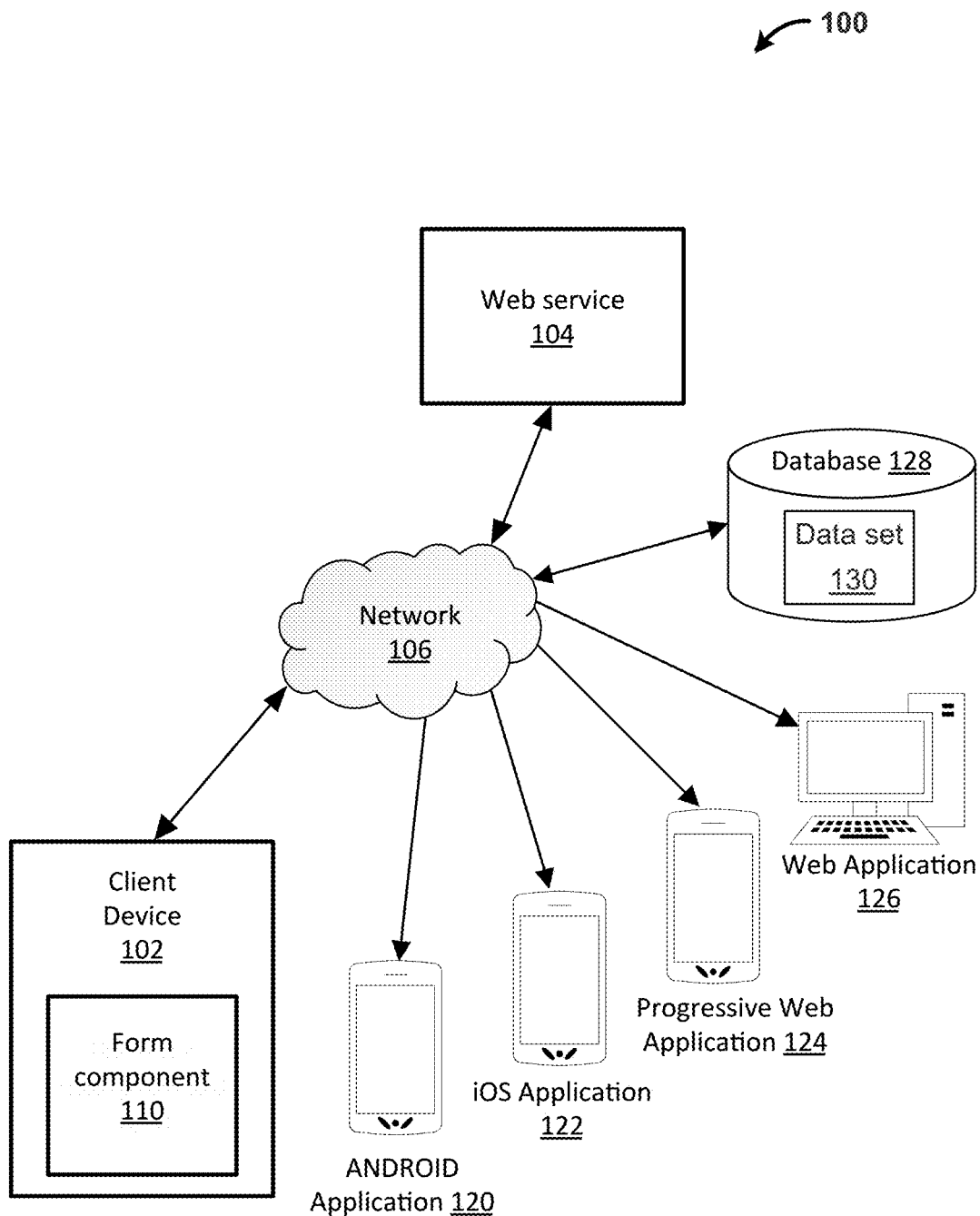
FIG. 1 illustrates a block diagram of the application generation environment on example devices.

FIG. 1 illustrates a block diagram of the application generation system 100 instantiated on example devices and platforms, which may be used for implementations described herein. Shown is a client device 102, web service

104, ANDROID application 120, iOS application 122, Progressive Web Application (PWA) 124, web application 126, and database 128, which may communicate with each other via a network 106. In various implementations, client device 102 may access services and data directly from web service 104. In some implementations, client device 102 includes a form component 110 configured to generate user interface (UI) components in order to receive input from one or more users. In some other implementations, client device 102 includes, for example, one or more GUIs for receiving input from one or more users, which may include the UI components generated by form component 110.

Network 106 may also communicate with other client devices, which may receive one or more generated applications. For example, ANDROID Application 120, iOS Application 122, and Progressive Web Application 124 may be deployed to a mobile device, and Web Application 126 may be accessible by a desktop or laptop computer. Example implementations associated with application generation system 100 are described in more detail herein.

Application generation system 100 may be any type of computing and/or data processing system, such as an enterprise computing environment, client-server system, and the like. Application generation system 100 may be configured to process data received from a user interface, such as a keyboard, mouse, etc., with regard to processes such as determining and differentiating types of code, generating, configuring, modeling, labeling, data binding, maintenance, etc., associated with data elements, applications, information, and the like as described herein.

Note that application generation system 100 presents a particular example implementation, where computer code for implementing embodiments may be implemented, at least in part, on a server. However, embodiments are not limited thereto. For example, a client-side software application hosted for example, on client device 102, may provide application generation system 100, or portions thereof, in accordance with the present teachings without requiring communications between the client-side software application and a server.

In one exemplary implementation, application generation system 100 may be communicatively connected to a display configured to display data, for example, to a user thereof. Displays, screens, and the like as described herein may be a passive or an active display, adapted to allow a user to view and interact with graphical data displayed thereon, via the user interface. In other configurations, a display may be a touch screen display responsive to touches, gestures, swipes, and the like for use in interacting with and manipulating data by a user thereof. Gestures may include single gestures, multi-touch gestures, and other combinations of gestures and user inputs adapted to allow a user to determine and isolate code, generate applications, convert data, model, analyze, deploy schemas, maintain data, etc.

In some implementations, application generation system 100 may include a data source such as database 128. Database 128 may be one or more databases connected to application generation system 100 directly or indirectly, for example via network connection 106, and may be implemented as a non-transitory data structure stored on a computer readable medium, such as a hard drive, Solid State Drive (SSD), flash memory, and the like, or may be stored as a part of a Cloud network, as further described herein.

Databases 128 may contain data sets 130. Data sets 130 may include data as described herein. Data sets 130 may also include data pertaining to determining and differentiating code, application deployment, application code, deployment schemas, data attributes, data models, data structures, data hierarchy, nodal positions, values, value types, summations, visualizations, algorithms, code (e.g., C++, JSON, JAVASCRIPT, XSD, XML, etc.), source, security, hashes, and the like. In addition, data sets 130 may also contain other data, data elements, and information such as metadata, labels, development-time information, run-time information, user configuration information, API, interface component information, library information, error threshold data, pointers, and the like.

In exemplary implementations, application generation system 100 may be adapted to receive data from user interface and/or database 128 for processing thereof. In one configuration, application generation system 100 may be a software engine configured to receive and process input data, such as application deployment parameters, etc., from a user thereof pertaining to data received from a user interface and/or database 128 in order to examine code, differentiate between code types, deploy and validate the deployment applications relative to a deployment schema and error thresholds. For example, during an application deployment, application generation system 100 may identify core application code versus device-specific code relative to data attributes and/or factors such as differentiation and deployment criteria, feature set of a receiving platform, type of application, etc.

Moreover, application generation system 100 may be used to determine whether errors in the deployed application are within acceptable thresholds, levels, etc., where some deployment error thresholds may be set for benign errors and/or for other types of user and/or system acceptable errors, thereby providing for an adjustable application deployment tolerance.

For example, application generation system 100 may allow for application deployment with an acceptable threshold level of errors, such as errors of certain types, acceptable errors, UI errors, software code errors, reference errors, and the like. Application generation system 100 may also be used to correct and resolve such errors or on the fly, with or without warnings given to a user thereof, in a recursive manner, for example, by using techniques such as code comparison, solving references, assigning target "QNames," specifying relative routes, etc.

Application generation system 100 in other implementations may be configured as a data analysis tool to perform analysis functions associated with data received from a user, for example. Such analysis functions may include using analysis of code attributes and/or other factors to determine and differentiate between core application code and device-specific code. The analysis may also include determining the attributes associated with data, determining the type of data, types of deployment schemas needed, determining the values of the data, data types, determining the relationships to other data, interpreting metadata associated with the data, determining error types, tolerance data, and the like.

For example, application generation system 100 may be configured to receive and analyze attributes of data sets 130 to determine core application code component requirements, determining device-specific code requirements, web application values, progressive application values, key/value pairs, string identifiers, data properties, types of errors, error tolerance levels, schema types, user interface configuration, definitions, data processing instructions, data attributes, data hierarchy, nodes, nodal positions within the hierarchy, values, data type, summations, algorithms, source, security, hashes, and the like, associated with data sets 130.

Application generation system 100 may receive existing data sets 130 from database 128 for processing thereof. Such data sets 130 may include and represent a composite of separate data sets 130 and data elements pertaining to, for example, organizational data, which may include data such as employment data, salary data, personnel data, and the like. In addition, data sets 130 may include other types of data, data elements, and information such as contact data, sales data, production data, scientific data, financial data, medical data, census data, and the like.

Application generation system 100 may be configured to receive configuration data pertaining to data, associated data sets 130, and other data associated with data such as user interface components, icons, user pointing device signals, and the like, used to render data on a display. In one exemplary implementation, application generation system 100 may be configured to render 2D and 3D graphical models and simulations to allow a user to obtain more information about data sets 130 associated with data. In one implementation, upon receiving instruction from a user, for example, through a user interface, a portion of application generation system 100 may be configured to generate a real-time display of interactive changes being made to data selected by a user thereof.

Figure 2:
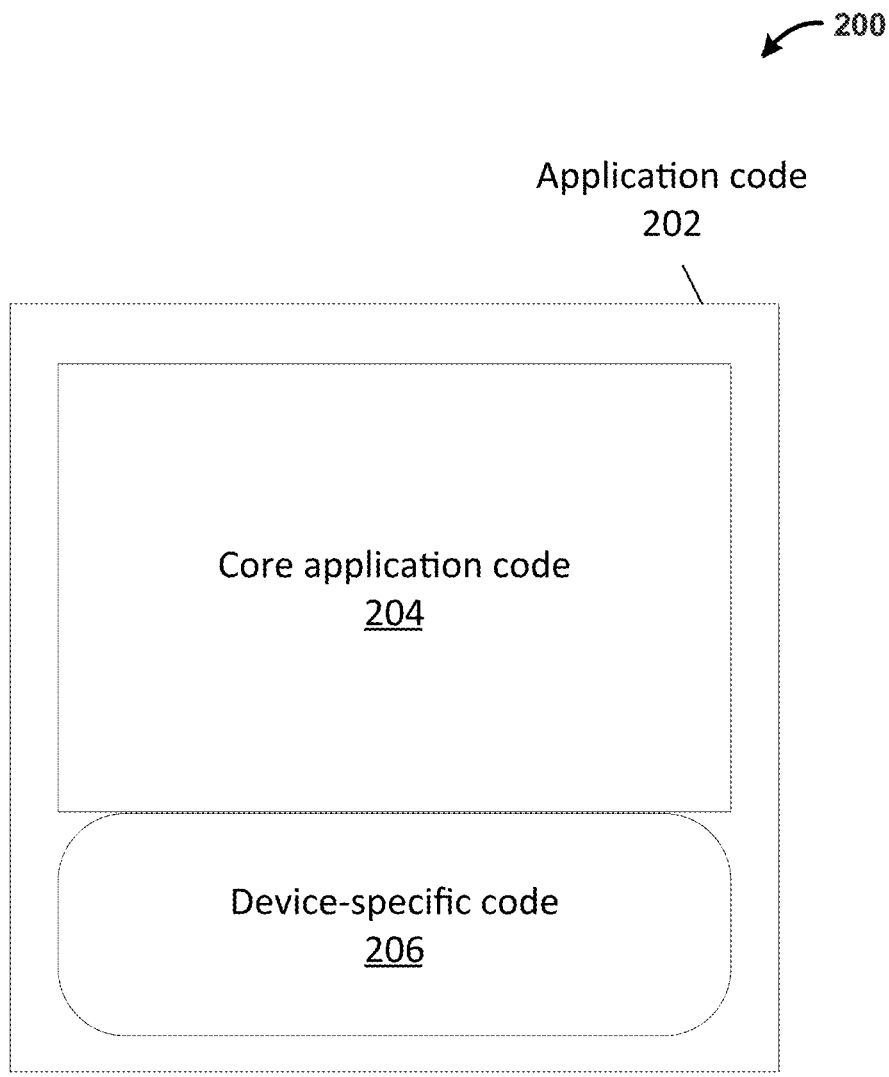
FIG. 2 illustrates a block diagram of the application code, including the core application code and device-specific code.

FIG. 2 shows a block diagram 200 of the application code 202, including core application code 204 and device-specific code 206. Core application code 204 may be determined and then isolated from device-specific code 206 by web service 104 in order to generate an application such as progressive web application 124, web application 126, and the like. In other implementations, core application code 304 and device-specific code 306 may be used together in order to generate other types of applications such as native mobile application, embedded applications, Application Program Interface (API) applications, which in some implementations may be, for example, an ANDROID application 120, an iOS application 122, and the like.

In implementations, application generation system 100 may be configured to determine what is core application code 204 and device-specific code 206, or a combination thereof. For example, application generation system 100 may be configured to analyze application code and determine based on attributes, data, and other inputs such as metadata, code values, code attributes, flags, type of code being use (e.g., JAVASCRIPT, C++, etc.,) whether the code being analyzed is core application code 204, device-specific code 206, or other types of code. In this configuration, application generation system 100 may be employed to learn and store the differences between code types in order to increase processor efficiency when processing application code.

Core application code 204 may be code signified as "core" to the particular application, which may then used as a foundational building code source code. In other implementations, core application code 204 may be defined via data criteria as "core." In this scenario, a user, such as a developer, may flag and/or define which portions of the code are "core," which may or may not be critical operating code elements. For example, a developer may provide information to application generation system 100 stipulating code written by a particular entity, group, etc., is considered "core" to the application, or may stipulate that "core" means code that must be used in every instance of the deployed applications, or code that is essential to a particular user, etc.

Device-specific code 206 may be code designed for a particular device platform such as iOS, ANDROID, and the like. Device-specific code 206 may also be code that is developed for a particular platform that takes into account specific criteria pertaining to the operation of the platform. For example, for a mobile platform, device-specific code 206 may be code required for a particular mobile device. As such, device-specific code 206 may be code that is designed to operate on a particular device or on a class of particular devices.

In other implementations, such core application code 204 and device-specific code 206 may be determined and divided based on other factors such as processor efficiency, load time, feature set, etc. For example, core application code 204 may be considered a subset of application code that may be employed by applications to use less processor resources, reduce load time, implement a reduced feature set, emphasize or deemphasize graphics, focus or defocus particular processing tasks, set power up and power down sequences, and the like.

Figure 3:
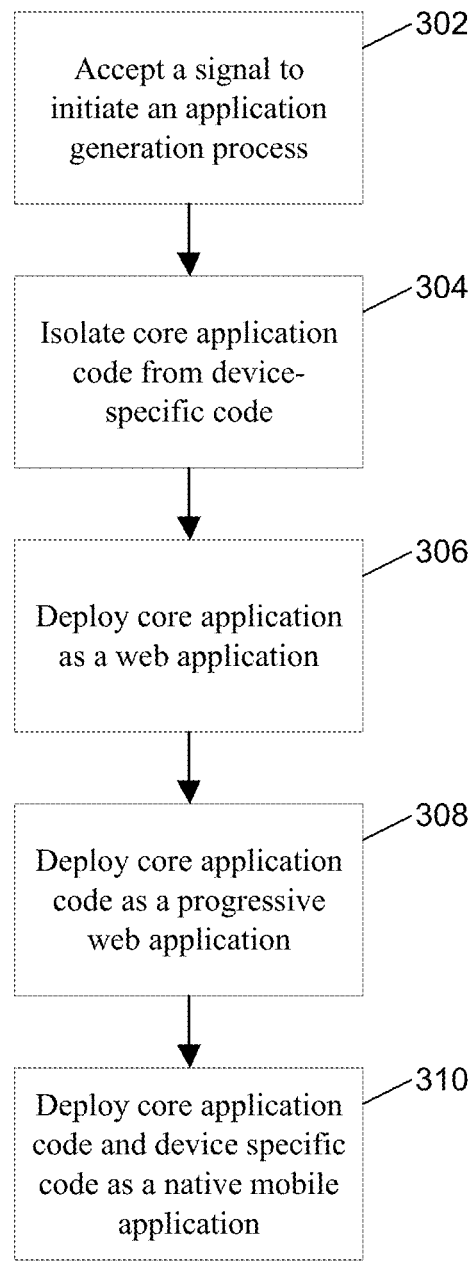
FIG. 3 illustrates a high-level flowchart showing an exemplary process of automatically generating applications.

FIG. 3 illustrates an example high-level flow diagram for an application generation process 300. At 302, a system such as client device 102 may obtain developer-provided input from, for example, form component 110, or the like, providing a GUI, etc. for accepting input. At 304, the client device 102 may then use web service 104 over network 106 to isolate core application code 204 from device-specific code 206. At 306, 308, and 310, application generation process 300 may employ an application deployment channel, such as web service 104, to deploy the application to one or more platforms. For example, application generation process 300 may deploy ANDROID Application 120, iOS Application 122, or Progressive Web Application 124 to a mobile device, or it may deploy Web Application 126.

In some implementations, at 302, process 300 accepts one or more signals to initiate an application generation process. For example, a user may input a signal via an UI input to initiate the generation of an application for use on one or more platforms such as an ANDROID Application 120, iOS Application 122, or Progressive Web Application 124 to a mobile device, Web Application 126, etc.

At 304, process 300 isolates or separates core application code 204 from device-specific code 206. For example, as described above, process 300 may analyze a multitude of attributes and/or other criteria to determine what code is core application code 204 and device-specific code 206. Such analysis may or may not require user input as process 300 may be configured to discern differences between such code through analyzing code operation, code attributes, code type, code identifiers, introspection, metadata, flags, labels, etc. Once process 300 has determined which code is core application code 204 and which code is device-specific code 206, process 300 may label such code and/or store such code with different identifiers in order to isolate or separate core application code 204 from device-specific code 206.

In some scenarios, core application code 204 and device-specific code 206 may be subsets of code deployable between a variety of different platforms. In some implementations, such core application code 204 and device-specific code 206 may be configured to allow such receiving platforms to operate within one or more acceptable error tolerance thresholds. For example, a core application code 204 may be a subset of code that induces differing amounts of errors that are acceptable relative to the error tolerance thresholds of receiving platforms.

At 306, process 300 deploys core application code 204 as a web application. In some scenarios, such core application code 204 may be different for a web application relative to other types of applications. For example, core application code 204 for a web application may be a subset of core application code 204 derived from 304. As such, in this scenario, core application code 204 may be adapted to a particular deployment. Further, such process 300 may enable and/or disable portions of the code as needed to allow a particular set of core application code 204 to be deployed across a multitude of platforms.

At 308, process 300 deploys core application code 204 as a progressive web application. In some scenarios, such core application code 204 may be different for a progressive web application relative to other types of applications. For example, core application code 204 for a progressive web application may be a subset of core application code derived from 304. As such, in this scenario, core application code 204 may be adapted to a particular web application deployment. Further, such process 300 may enable and/or disable portions of the code as needed to allow a particular set of core application code 204 to be deployed across a multitude of web application platforms. In other scenarios, core application code 204 is a subset of code that may be deployed between a variety of different web application platforms.

At 310, process 300 deploys core application code 204 and device-specific code 206 as a native mobile application. In exemplary scenario, such core application code 204 and device-specific code 206 may be different for a native mobile application relative to other types of applications. For example, core application code 204 for a native mobile application may be a subset of core application code 204 and device-specific code 206 derived from 304. As such, in this scenario, core application code 204 may be adapted to a particular native mobile application deployment. Further, such process 300 may enable and/or disable portions of the code as needed to allow a particular set of core application code 204 and device-specific code to be deployed across a multitude of platforms. In other scenarios, core application code 204 may be a subset of code that may be deployed between a variety of different native mobile application platforms.

Figure 4:
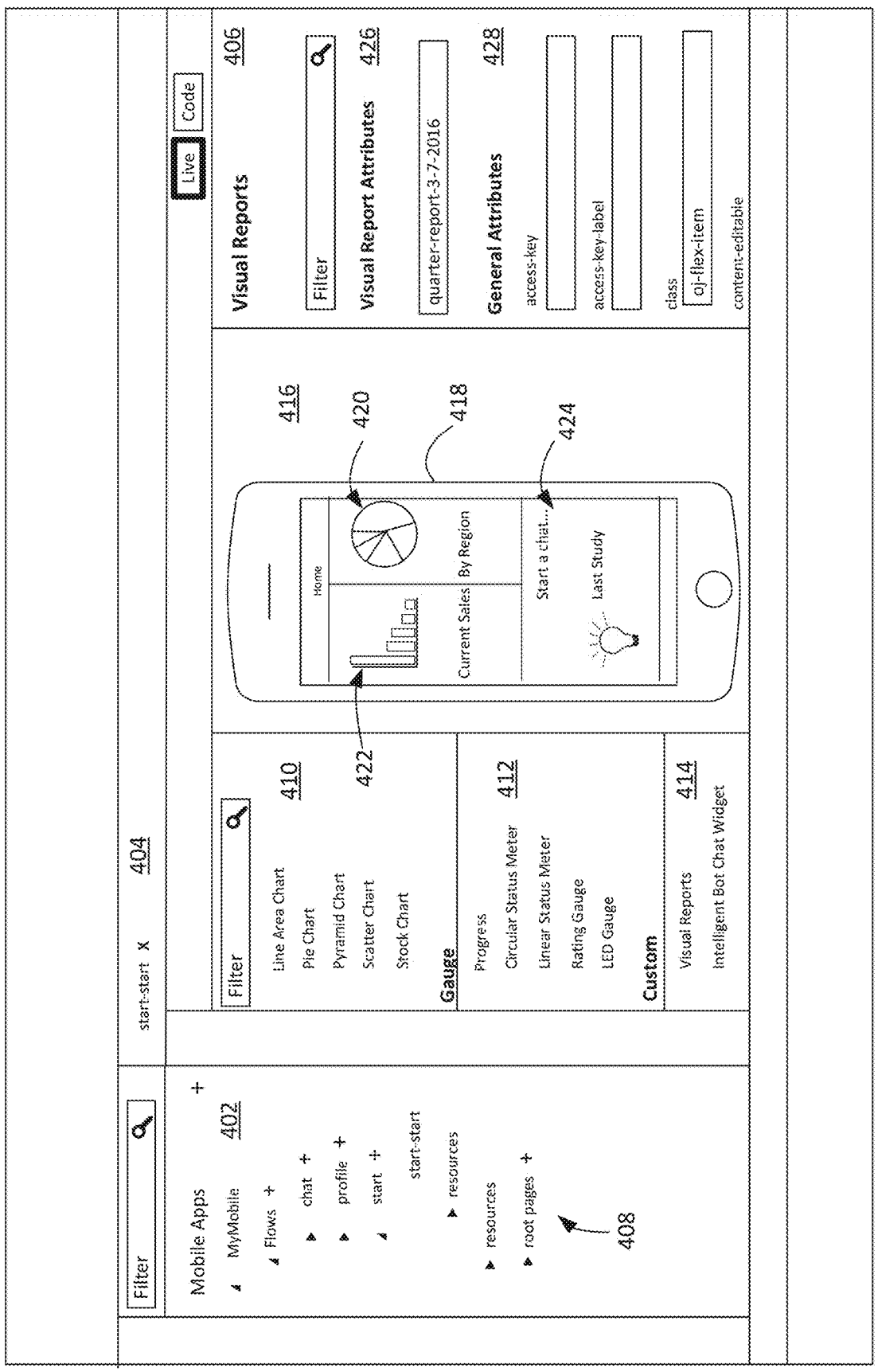
FIG. 4 illustrates an example user interface for mobile development.

FIG. 4 is an example user interface for mobile development. On display screen 400, a user, such as a developer, may specify though a GUI, and the like, the layout and functionality of their application independent of platform. For example, the developer might configure the application with the capability to take a photo or use GPS for location tracking. The application may also be configured with visual layout items such as charts or loading icons.

In Implementations screen 400 may include a resource interface 402, a mobile screen layout tool 404, and a report tool 406 configured to accept user input for configuring a mobile application. Resource interface 402 provides a user with resource tools 408 configured to provide a user with tools to allow a user to develop a mobile application such as application flows, application resources, root pages, and other tools such as tools to set error threshold levels, tools to define errors of certain types, acceptable errors, reference errors, and the like.

Mobile screen layout tool 408 may include chart development tool 410, gauge tool 412, custom tool 414, and mobile application emulation tool 416. In implementations, chart development too 410 may be configured to display pre-designed charts for user selection. Gauge tool 412 may be configured to provide the user with a number of gauges for display on screen 400. Custom tool 412 may be configured with custom tools to allow a user to customize screen 400 display and functionality.

Mobile application emulation tool 416 may be employed to emulate the resultant choices of UI elements and functionality. For example, in this scenario, emulated mobile phone 418 displays selected charts 420, graphs 422, and chat functionality 424.

In implementations, report tool 406 provides a user with control over attributes such as visual report attributes 426 and general attributes 428. For example, visual reports attributes may allow the user to define attributes such as report attributes. General attributes 428 may allow a user to define attributes such as access key attributes, access key labels, classes, etc.

Figure 5:
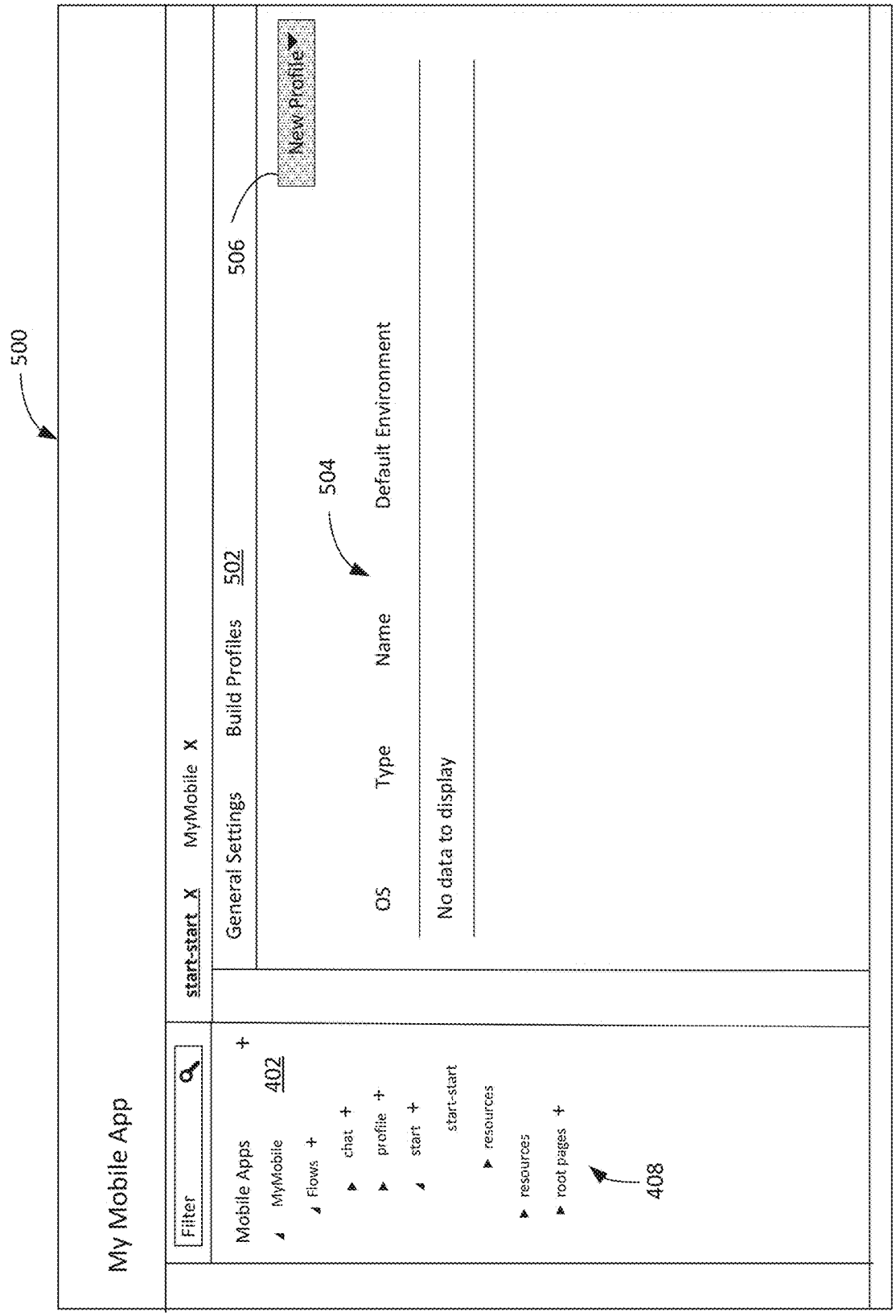
FIG. 5 illustrates an example user interface for managing configuration of device-specific code.

FIG. 5 is an example user interface 500 for managing configuration of device-specific code (e.g. build profiles). Interface 500 includes a build window 502 which is configured to allow a user to configure aspects of an application build such as configure settings, set build profiles, etc. For example, employing build window 502, for each native mobile application deployed, a build profile 504 may be configured.

When button 506 is selected on screen 500, a user, such as a developer, may be navigated to another screen where the build properties for the application, such as a native mobile application can be specified, as shown, for example, in FIGS. 6 and 7.

FIG. 6 shows an example user interface screen 600 for specifying iOS specific build information. Although specific platform characteristics such as hardware or operating system options may be discussed, features of the embodiments may be used with any suitable platform or platform characteristics. UI screen 600 may include a plurality of inputs to select and/or enter options for specifying all of the device-specific information for an iOS application. For example, the developer may have options to specify a build profile name 602, a build type 604, a bundle identifier 606, a bundle version name 608 and a version 610, a developer certificate 612, a provisioning profile 616, a signing identity 618, etc. In some implementations, UI screen 600 may include a UI widget such as a checkbox 620 to set a particular build as a default build used for staging and/or publishing the application.

FIG. 7 shows an example user interface screen 700 for specifying ANDROID specific build information. Screen 700 may include options for specifying all of the device-specific information for an application, such as an ANDROID application. For example, a user, such as a developer may have options to specify the build profile name 602, the build type 604, application identifier 702, application version name 704, version code 706, a developer keystore 708, keystore password 710, key alias 712, key password 714, etc.

Figure 8:
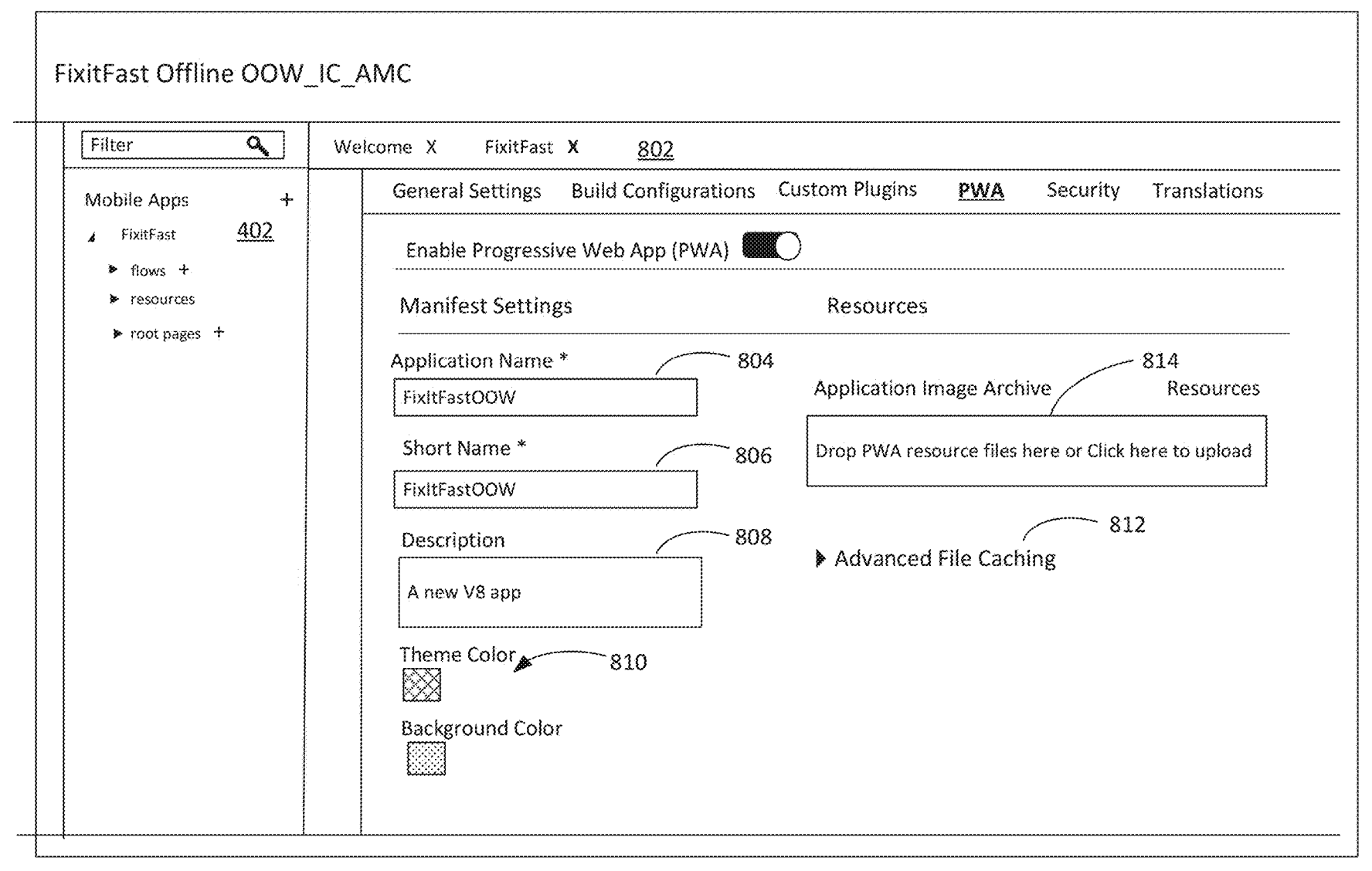

FIG. 8 shows an example user interface screen 800 for specifying Progressive Web Application specific build information. UI Screen 800 may include a progressive web application build UI interface 802 which may include options, for example, for specifying application name 804, short name 806, description 808, theme color 810, application icon 810, file caching schema 812, etc.

Figure 9:
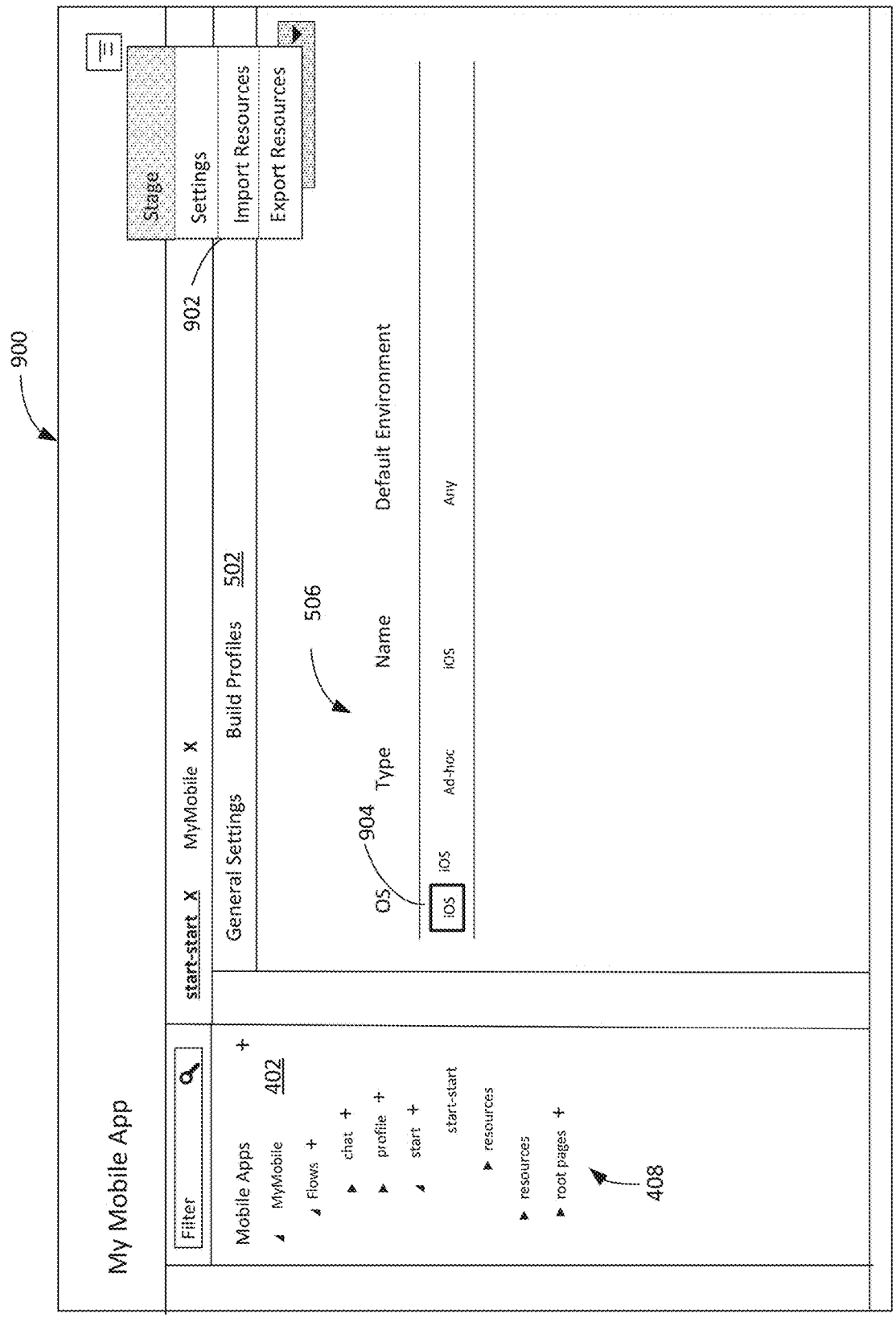
FIG. 9 illustrates an example user interface for initiating the application staging process.

FIG. 9 shows an example user interface screen 900 for initiating the application staging process once the device-specific information is configured. On screen 900, the user interface may have a button 902 to navigate to the deployment screen, shown in FIG. 10. The terms "staged" and "deployed" are used interchangeably herein. In implementations, UI screen 900 may also include a staging identifier 904 used to denote which applications are being staged for deployment.

Figure 10:
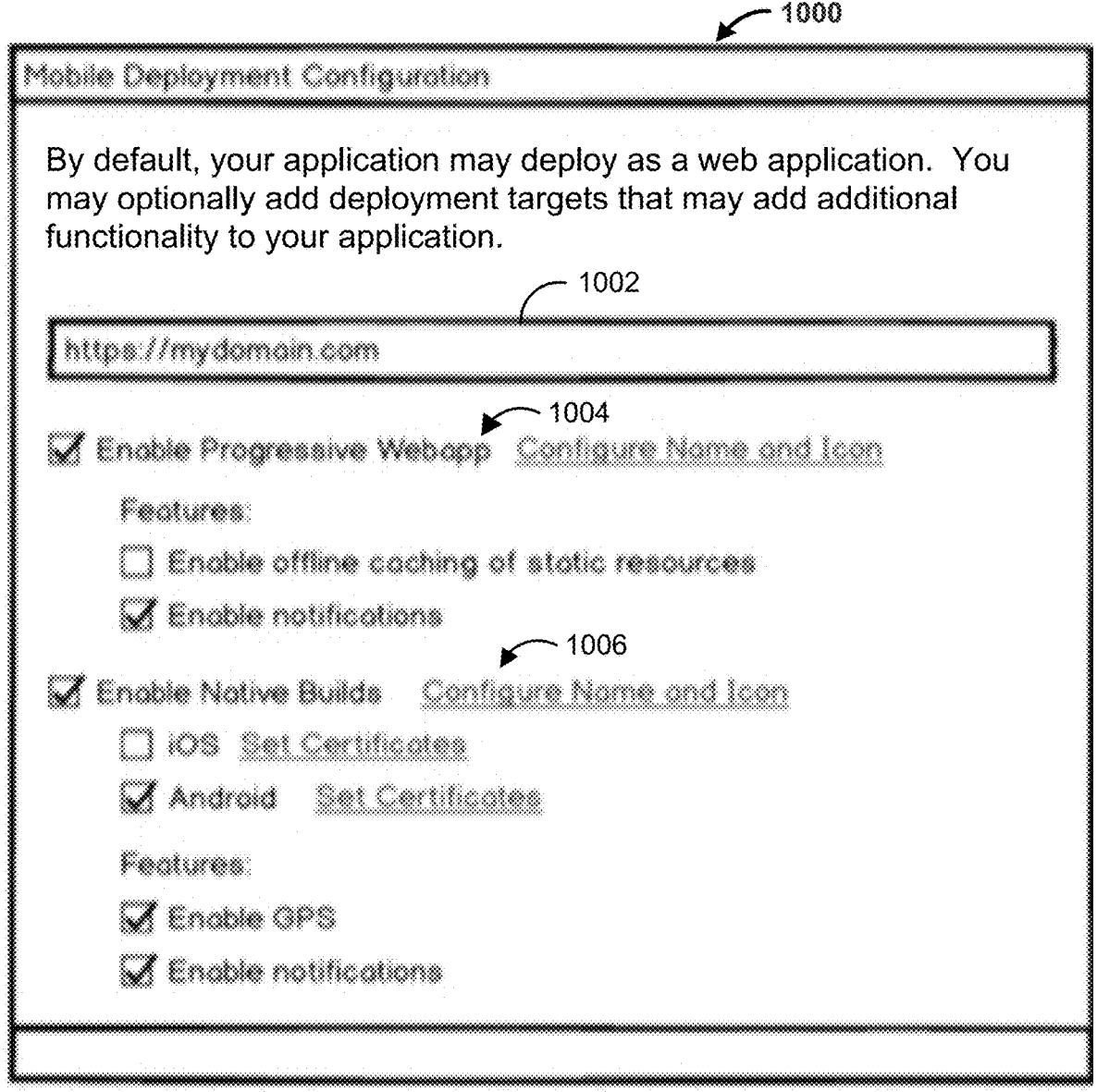
FIG. 10 illustrates an example user interface for configuring deployment of the application to different platforms.

FIG. 10 is an example user interface screen 1000 for configuring deployment of an application to different platforms. On screen 1000, a user, such as a developer, may specify an application URL for the web application in field 1002. The user may also configure Progressive Web Application settings 1004 which may, for example, include settings for offline caching, notifications, and specifying the name and icon associated with the application. In addition, the user may configure native mobile application settings 1006, including settings for a plurality of application builds such as iOS and ANDROID builds. For example, native mobile application settings 1006 may include options for setting permission, certificates, etc. and enabling features such as GPS tracking and notifications, specifying the name and icon associated with the application, and the like.

Figure 11:
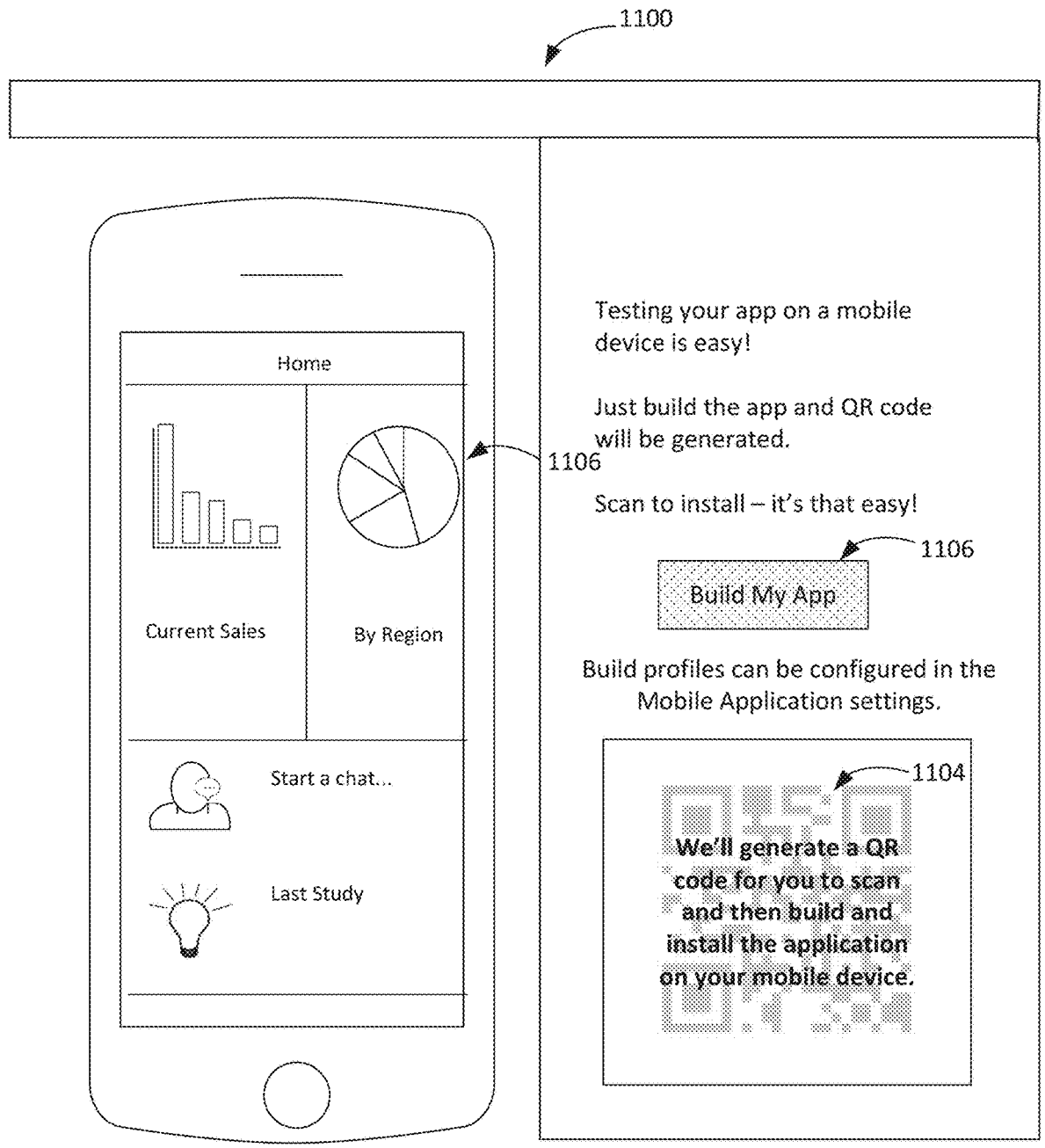
FIG. 11 illustrates an example user interface for testing the staged application.

FIG. 11 shows an example user interface screen 1100 employed for testing a staged application. In screen 1100, a user such as a developer may test the staged application either in a UI interface such as a browser, by using a QR code to install it on a phone, etc. In one implementation, screen 1100 may include a build application tool 1102 which is configured to build an application based on various build inputs received, for example, from inputs described herein, and then generate an application generation instruction 1104, such as a QR code, which when initiated generates an application on a host device 1106, such as a mobile phone.

Figure 12:
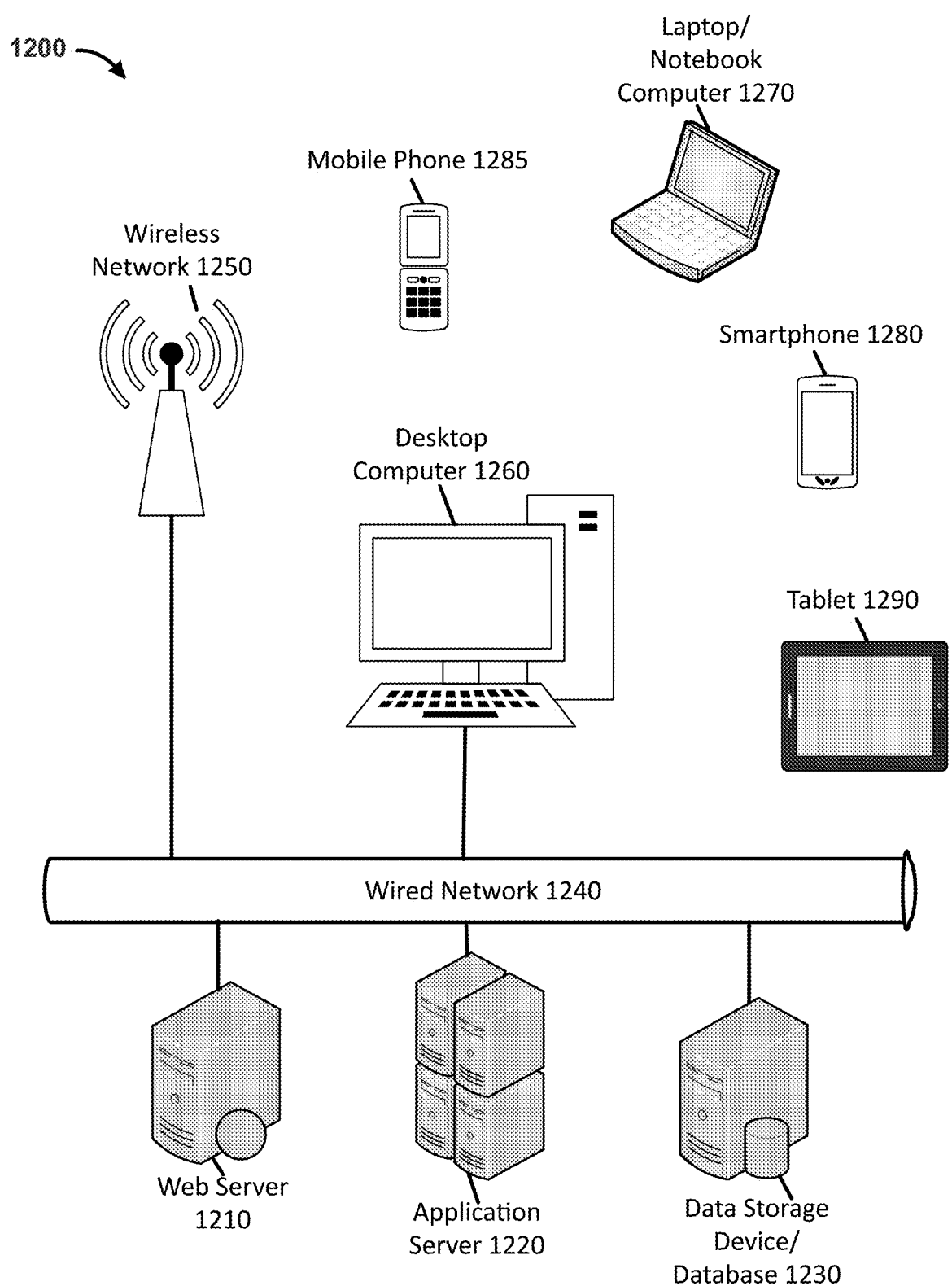
FIG. 12 illustrates a block diagram of an example system, which may be used for implementations described herein.

FIG. 12 illustrates a block diagram of an example system 1200, which may be used for implementations described herein. Example system 1200 is capable of supporting or running various hardware and/or software modules and associated methods discussed with reference to implementations described herein. Note that certain implementations may be implemented using one or more standalone applications (for example, residing in a user device) and/or one or more web-based applications implemented using a combination of client-side and server-side code. While system 1200 performs implementations described herein, in other implementations, any suitable component or combination of components associated with system 1200 or any suitable processor or processors associated with system 1200 may facilitate performing the implementations described herein. In various implementations, system 1200 may not have all of the components shown and/or may have other elements including other types of components instead of, or in addition to, those shown herein.

General system 1200 includes user devices 1260-1290, including one or more desktop computers 1260, one or more notebook computers 1270, one or more smartphones 1280, one or more mobile phones 1285, and one or more tablets 1290. General system 1200 can interface with any type of user device, such as a thin-client computer, Internet enabled mobile telephone, mobile Internet access device, tablet, electronic book, or personal digital assistant, capable of displaying and navigating web pages or other types of electronic documents and UIs, and/or executing applications. Although system 1200 is shown with five user devices, any number of user devices can be supported.

A web server 1210 is used to process requests from web browsers and standalone applications for web pages, electronic documents, enterprise data or other content, and other data from the user computers. Web server 1210 may also provide push data or syndicated content, such as RSS feeds, of data related to enterprise operations.

An application server 1220 operates one or more applications. The applications can be implemented as one or more scripts or programs written in any programming language, such as JAVA, C, C++, C#, or any scripting language, such as JAVASCRIPT or European computer manufacturers association script (ECMAScript), Perl, hypertext preprocessor (PHP), PYTHON, Ruby, or tool command language (TCL). Applications can be built using libraries or application frameworks, such as Rails, ENTERPRISE JAVABEANS, or .NET. Web content may be created using hypertext markup language (HTML), cascading style sheets (CSS), and other web technology, including templating languages and parsers.

The data applications running on application server 1220 are adapted to process input data and user computer requests and can store or retrieve data from data storage device or database 1230. Database 1230 stores data created and used by the data applications. In some implementations, database 1230 includes a relational database that is adapted to store, update, and retrieve data in response to SQL format commands or other database query languages. Other implementations may use unstructured data storage architectures and Not Only SQL (NoSQL) databases.

In some implementations, application server 1220 includes one or more general purpose computers capable of executing programs or scripts. In some implementations, web server 1210 is implemented as an application running on the one or more general purpose computers. Web server 1210 and application server 1220 may be combined and executed on the same computers.

An electronic communication network 1240-1250 enables communication between user computers 1260-1290, web server 1210, application server 1220, and database 1230. In some implementations, networks 1240-1250 may further include any form of electrical or optical communication devices, including wired network 1240 and wireless network 1250. Networks 1240-1250 may also incorporate one or more local-area networks, such as an Ethernet network, wide area networks, such as the Internet; cellular carrier data networks; and virtual networks, such as a virtual private network.

System 1200 is one example for executing applications according to some implementations. In some implementations, application server 1210, web server 1220, and optionally database 1230 can be combined into a single server computer application and system. In further implementations, virtualization and virtual machine applications may be used to implement one or more of application server 1210, web server 1220, and database 1230.

In still further implementations, all or a portion of the web and application serving functions may be integrated into an application running on each of the user computers. For example, a JAVASCRIPT application on the user computer may be used to retrieve or analyze data and display portions of the applications.

In various implementations, system 1200 may not have all of the components shown and/or may have other elements including other types of components instead of, or in addition to, those shown herein.

Figure 13:
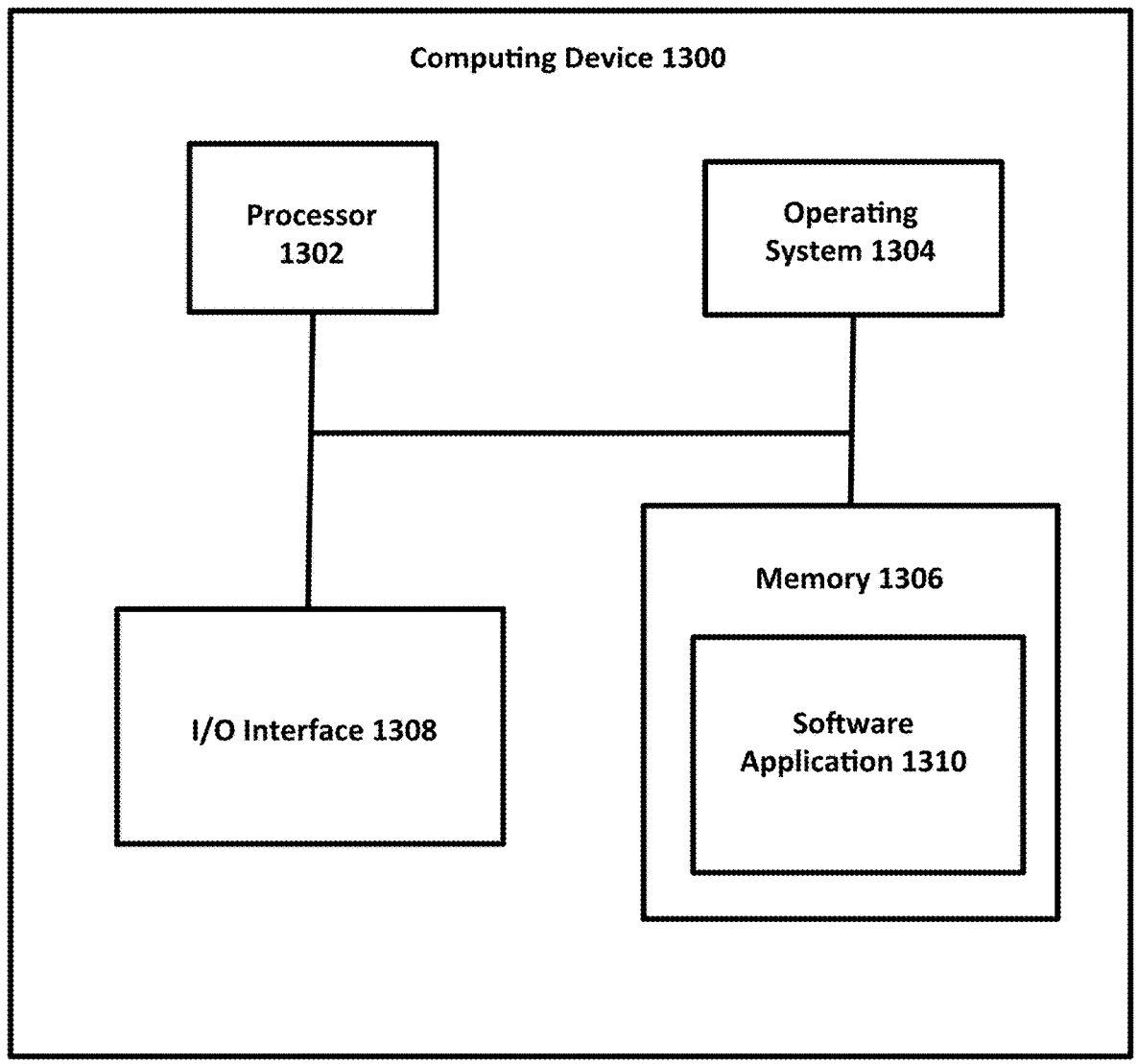
FIG. 13 illustrates a block diagram of an example network environment, which may be used for implementations described herein.

FIG. 13 is a general block diagram of a computing device 1300 usable to implement the embodiments described herein. As an example, the computing device 1300 may be configured to implement at least part of the application generation process 300 as shown in FIG. 3. Alternatively or in addition, the computing device 1300 may be configured to implement at least part of the user interfaces as shown in FIGS. 4-11. While the computing device 1300 of FIG. 13 may be described as performing one or more of the steps in the embodiments herein, in other embodiments any suitable component or combination of components of the computing device 1300 or any suitable processor or processors associated with system 1300 may facilitate performing the steps.

FIG. 13 illustrates a block diagram of an example computing system 1300, which may be used for implementations described herein. For example, computing system 1300 may be used to implement user devices 1260-1290, and server devices 1210, 1220 of FIG. 12 as well as to perform the method implementations described herein. In some implementations, computing system 1300 may include a processor 1302, an operating system 1304, a memory 1306, and an input/output (I/O) interface 1308. In various implementations, processor 1302 may be used to implement various functions and features described herein, as well as to perform the method implementations described herein. While processor 1302 is described as performing implementations described herein, any suitable component or combination of components of system 1300 or any suitable processor or processors associated with system 1300 or any suitable system may perform the steps described. Implementations described herein may be carried out on a user device, on a server, or a combination of both.

Computing device 1300 also includes a software application 1310, which may be stored on memory 1306 or on any other suitable storage location or computer-readable medium. Software application 1310 provides instructions that enable processor 1302 to perform the functions described herein and other functions. The components of computing system 1300 may be implemented by one or more processors or any combination of hardware devices, as well as any combination of hardware, software, firmware, etc.

For ease of illustration, FIG. 13 shows one block for each of processor 1302, operating system 1304, memory 1306, I/O interface 1308, and software application 1310. These blocks 1302, 1304, 1306, 1308, and 1310 may represent multiple processors, operating systems, memories, I/O interfaces, and software applications. In various implementations, computing system 1300 may not have all of the components shown and/or may have other elements including other types of components instead of, or in addition to, those shown herein.

Although the description has been described with respect to particular embodiments thereof, these particular embodiments are merely illustrative, and not restrictive.

Any suitable programming language can be used to implement the routines of particular embodiments including C, C++, JAVA, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory processor-readable storage device for use by or in connection with the instruction execution system, apparatus, system, computer, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for generating and deploying applications, the method comprising:
   receiving a user input to generate an application configured to be deployed as at least one of a web application, a progressive web application or a native application on a particular platform from a choice of multiple platforms;
   examining at least one criteria of application code to determine core application code and device-specific code, wherein the core application code includes a first subset of core code deployable as a web application, a second subset of code deployable as a progressive web application, and a third subset of code deployable as a native application;

isolating or separating the core application code from the device-specific code;

determining a target subset from the first subset, the second subset, and the third subset, required for deployment according to the user input as one or more of the web application, progressive web application or the native application;

adapting the core application code to allow the target subset to be deployed; and deploying the adapted core application code and the target subset.

2. The method of claim 1, wherein the application is deployed with features determined based on deployment method and feature sets of the particular platform.

3. The method of claim 1, wherein isolating or separating of the core application code is by labeling the core application code with an identifier or storing the core application code with the identifier.

4. The method of claim 1, wherein the at least one criteria is selected from a group of criteria comprising code operation, code attributes, code type, code identifiers, introspection, metadata, flags, labels, and combinations thereof.

5. The method of claim 1, wherein adapting the core application code includes enabling the target subset or disabling other portions of the core application code that excludes the target subset.

6. The method of claim 1, further comprising:
analyzing the application code to determine types of errors;
setting at least one acceptable error tolerance threshold for particular error types of the determined types of errors; and
determining whether the core application code functions on the particular platform within the at least one acceptable error tolerance threshold set for the particular error types.

7. The method of claim 1, wherein the user input includes specifying a uniform resource locator (URL) for the application.

8. The method of claim 7, wherein the user input further includes specifying at least one setting for a progressive web application and at least one setting for a native mobile application.

9. A non-transitory computer readable medium including one or more instructions for automatically generating and deploying applications and executable by one or more processors for:

receiving a user input to generate an application configured to be deployed as at least one of a web application, a progressive web application or a native application on a particular platform from a choice of multiple platforms;

examining at least one criteria of application code to determine core application code and device-specific code, wherein the core application code includes a first subset of core code deployable as a web application, a second subset of code deployable as a progressive web application, and a third subset of code deployable as a native application;

isolating or separating the core application code from the device-specific code;

determining a target subset from the first subset, the second subset, and the third subset, required for deployment according to the user input as one or more of the web application, progressive web application or the native application;

adapting the core application code to allow the target subset to be deployed; and deploying the adapted core application code and the target subset.

10. The non-transitory computer readable medium of claim 9, wherein the application is deployed with features determined based on deployment method and feature sets of the particular platform.

11. The non-transitory computer readable medium of claim 9, wherein isolating or separating of the core application code is by labeling the core application code with an identifier or storing the core application code with the identifier.

12. The non-transitory computer readable medium of claim 9, wherein the at least one criteria is selected from a group of criteria comprising code operation, code attributes, code type, code identifiers, introspection, metadata, flags, labels, and combinations thereof.

13. The non-transitory computer readable medium of claim 9, wherein the user input includes specifying a URL for the application.

14. The non-transitory computer readable medium of claim 13, wherein the user input further includes specifying at least one setting for a progressive web application and at least one setting for a native mobile application.

15. An apparatus for generating and deploying applications in a computing environment, the apparatus comprising:

an application generation system that includes one or more hardware processors to execute software configured to generate and deploy applications accessible to one or more computing devices of the computing environment, a computing device of the one or more computing devices comprising:

the one or more hardware processors; and logic encoded in one or more non-transitory media for execution by the one or more hardware processors and when executed operable for:

receiving a user input to generate an application configured to be deployed as at least one of a web application, a progressive web application or a native application on a particular platform from a choice of multiple platforms;

examining at least one criteria of application code to determine core application code and device-specific code, wherein the core application code includes a first subset of core code deployable as a web application, a second subset of code deployable as a progressive web application, and a third subset of code deployable as a native application;

isolating or separating the core application code from the device-specific code;

determining a target subset from the first subset, the second subset, and the third subset, required for deployment according to the user input as one or more of the web application, progressive web application or the native application;

adapting the core application code to allow the target subset to be deployed; and deploying the adapted core application code and the target subset.

16. The apparatus of claim 15, wherein the application is deployed with features determined based on deployment method and feature sets of the particular platform.

17. The apparatus of claim 15, wherein isolating or separating of the core application code is by labeling the core application code with an identifier or storing the core application code with the identifier.

18. The apparatus of claim 15, wherein the at least one criteria is selected from a group of criteria comprising code operation, code attributes, code type, code identifiers, introspection, metadata, flags, labels, and combinations thereof.

19. The apparatus of claim 15, the user input includes specifying a URL for the application.

20. The apparatus of claim 19, wherein the user input further includes specifying at least one setting for a progressive web application and at least one setting for a native mobile application.

* * * * *